US005979702A

United States Patent [19]

Hennessey et al.

[11] Patent Number: 5,979,702

[45] Date of Patent: Nov. 9, 1999

[54] METHOD AND APPARATUS FOR AUTOMATICALLY CREATING BLENDED STREAM OF PROMOTIONAL ARTICLES

[75] Inventors: Thomas P. Hennessey, Indianapolis; Michael E. Corcoran, Crawfordsville, both of Ind.; Michael D. Dennis, Longview, Ill.; Michael E. Albertson, Brownsburg; Richard A. Laveault, Crawfordsville, both of Ind.

[73] Assignee: Alcoa Closure Systems International, Inc., Crawfordsville, Ind.

[21] Appl. No.: 09/128,795

[22] Filed: Aug. 4, 1998

[51] Int. Cl.[6] .................................................... B65G 59/00

[52] U.S. Cl. ................................................ 221/206; 221/2

[58] Field of Search ................................ 221/2, 13, 112, 221/131, 133, 191, 195, 200, 206, 207, 258

[56] References Cited

U.S. PATENT DOCUMENTS 3,187,760 6/1965 Simjian .............................. 221/206 X
3,575,316 4/1971 Bianchi .................................. 221/133
5,056,681 10/1991 Howes .
5,097,982 3/1992 Kedem et al. ...................... 221/131 X
5,348,061 9/1994 Riley et al. ......................... 221/133 X
5,611,456 3/1997 Kasper ............................... 221/195 X
5,667,096 9/1997 Wu ..................................... 221/133 X
5,806,707 9/1998 Boehm et al. .

*Primary Examiner*—William E. Terrell
*Assistant Examiner*—Gene O. Crawford
*Attorney, Agent, or Firm*—Rockey, Milnamow & Katz, Ltd.; Edward L. Levine

[57] ABSTRACT

A method and apparatus are disclosed for creating a blended stream of articles, such as for use in connection with product promotions and the like. The invention contemplates that first and second streams of discrete promotional articles are blended so that the resultant stream includes articles at a predetermined ratio. The present invention facilitates creation of a blended product stream comprising all winning promotional articles with differing values, with subsequent formation of a blended article stream comprising winning and non-winning promotional articles. Precise and cost-effective introduction of the winning and non-winning promotional articles into the marketplace can thus be effected.

10 Claims, 6 Drawing Sheets

METHOD AND APPARATUS FOR AUTOMATICALLY CREATING BLENDED STREAM OF PROMOTIONAL ARTICLES

TECHNICAL FIELD

The present invention relates generally to a method and apparatus for handling discrete promotional articles, and for automatically creating a blended stream of the articles, wherein the blended stream includes at least two differing types of the promotional articles. The apparatus is particularly suited for creating a blended stream of promotional articles, including both winning and non-winning articles, and winning articles of differing values. The invention is particularly suited for creating a blended stream of promotional closure articles.

BACKGROUND OF THE INVENTION

Games and like promotions which can be played in connection with purchase of certain products have demonstrated enduring appeal with consumers. Promotions of this nature typically include the introduction into a product stream of both winning and non-winning promotional articles, with the articles ordinarily being indiscernible from each other prior to purchase. Upon purchase, consumers open the product packaging, or otherwise determine whether the promotional article is one of the winners. Frequently, the articles can be employed in a "secondary" game, so even if the article is initially of the non-winning type, the articles can be collected for another opportunity to win in the secondary game. Promotions of the above type have been particularly popular in connection with sale and consumption of beverages, where closures on the beverage containers may be printed with suitable indicia in connection with a game, or may be provided with removable gaming pieces or the like carried in or on the closure.

Promotions of the above type are ordinarily subject to state and/or federal regulations, which typically require that consumers be advised of the odds of winning differently valued prizes in the promotion. Accordingly, it is necessary that the requisite mix of winning and non-winning promotional articles be introduced into the marketplace to provide the requisite odds in compliance with regulations.

As will be appreciated, depending upon the specific nature of the promotion, and the numbers of winning and non-winning promotional articles involved, achieving the requisite blend of winning and non-winning articles can be somewhat problematical. For certain promotions, a relatively large number of relatively low-value winning articles may be introduced into a stream of non-winning articles, which may be possible to achieve attendant to the usual manufacture of such articles. Nevertheless, instances of pilferage of the winning articles can occur, mandating careful control to assure that the requisite blend of winning and non-winning articles is achieved in the marketplace.

For some promotions, a relatively small number of relatively high-value prizes may be awarded, and experience has shown that this can require specialized handling of the winning promotional articles. "Hand-seeding" of the winning articles may be required in some instances to assure that the requisite blend of articles is achieved in the marketplace. As a consequence, the costs associated with running the promotion can be undesirably increased.

The present invention contemplates a method and apparatus for creating a blended stream of promotional articles, such as winning and non-winning promotional articles, or winning articles of differing values, for use in connection with product promotions and the like. While the present invention has been developed for use in connection with promotional closures for containers, it will be recognized that an invention embodying the principles disclosed herein has widely varying applications.

SUMMARY OF THE INVENTION

The present invention contemplates a method of automatically creating a blended stream of promotional articles, such as promotional closures or the like, wherein the blended article stream includes differing articles at a ratio having a predetermined value. As such, the present invention particularly lends itself to creating the requisite blended article stream for product promotions and the like, since the invention facilitates highly efficient and cost-effective creation of a product mix of the differing articles which satisfies the requirements relating to established odds-of-winning. While the present invention is particularly suited for use in connection with such product promotions, it will be recognized that the principles of the present invention lend it to other applications where it is desired to create precise, predetermined blends of differing articles.

As will be further described, the present invention lends itself to creation of a blended stream of promotional articles containing both winning and non-winning articles, as well as the creation of a blended stream containing winning articles of differing values. It is presently contemplated that the invention can be employed for creating a first blend of differing winning articles, with this blend of winning articles then introduced into a stream of non-winning articles to create ratios of each of the winning articles, to the overall product mix, at individual predetermined values.

The present invention contemplates that a blended stream of promotional articles is automatically created by providing a first stream of discrete promotional articles, and a second stream of discrete promotional articles. The present method further comprises automatically counting a predetermined number of the articles in the first stream, and thereafter introducing at least one promotional article from the second stream into the first stream to create the desired blended stream of promotional articles. By this technique, the ratio of the articles from the first stream to the articles in the second stream comprises a predetermined value. In one form of the invention, the first product stream comprises non-winning promotional articles, and the second product stream comprises winning promotional articles. In another aspect of the invention, the first and second product streams respectively comprise different winning promotional articles, such as winning articles of differing values.

Depending upon the nature of the blended stream which is desired to be formed, the present invention contemplates that a third stream of articles can be provided. If it is desired to create an overall mix of all winning promotional articles having three different values (such a for subsequent introduction into a stream of non-winning promotional articles), articles in the previously formed blended stream are counted, with at least one article from the third product stream introduced thereinto to create a further blended stream comprising articles from each of said first, second, and third streams in predetermined ratios to each other. In contrast, if the present invention is being practiced to create the overall mix of winning and non-winning articles, the present invention contemplates that articles in the third stream are counted, with at least one article from the blended stream introduced into the third stream to thereby create a further blended stream comprising articles from said first, second, and third streams in predetermined ratios to each other. As will be recognized, this aspect of the invention contemplates that articles in the first and second streams comprise winning promotional articles, while articles in the third stream comprise non-winning promotional articles.

An important aspect of the present invention relates to the creation of printed records which correspond to the ratios which exist in the blended stream of articles. In this manner, a printed record can be created which reflects the exact ratio of winning articles having differing values. Such a printed record is particularly useful for ultimately creating the final overall mix of both winning and non-winning promotional articles, by inputting the printed record into means for controlling the introduction of articles from the blended (all winning) stream into the third (non-winning) stream to create the further blended stream comprising promotional articles from each of said first, second, and third streams.

The apparatus for practicing the present invention includes an arrangement for storing a plurality of the articles, and an arrangement for dispensing each one of the plurality of stored articles, preferably one-at-a-time, into a stream of the articles to create the desired blended stream. In the illustrated embodiment, a gravity-feed storage hopper provides the desired storage arrangement, with a vibratory bowl operatively positioned intermediate the storage hopper and the dispensing arrangement for orienting the articles into a single line for dispensing. The apparatus includes various sensing arrangements for sensing the level of articles within the storage hopper, and for verifying that each of the articles is dispensed as intended by the dispensing arrangement.

The apparatus includes a control arrangement for operating the dispensing arrangement to create the desired blended stream of articles at the predetermined ratio. A bar code reader is operatively connected to the controls for creating the predetermined ratio.

In one illustrated embodiment of the apparatus, the apparatus is particularly configured for the introduction of a stream of winning promotional articles (which may itself comprise a blended stream of winning articles of differing values) into a stream of non-winning articles, to thereby create the overall product mix for the marketplace. In an alternate embodiment, the present apparatus is configured to create the desired blended stream of winning articles. In this embodiment, a second storage arrangement is provided, as is a second dispensing arrangement. The apparatus is operated to create the desired blended stream from articles from each of the first and second storage arrangements. Suitable conveyors can be provided for conveying the articles from the first and second streams to shipping containers or the like for subsequent shipment to remote locations, where the blended stream of winning articles can be introduced into the stream of non-winning articles for ultimate introduction into the marketplace.

Other features and advantages of the present invention will become readily apparent from the following detailed description, the accompanying drawings, and the appended claims.

DETAILED DESCRIPTION

Figure 3:
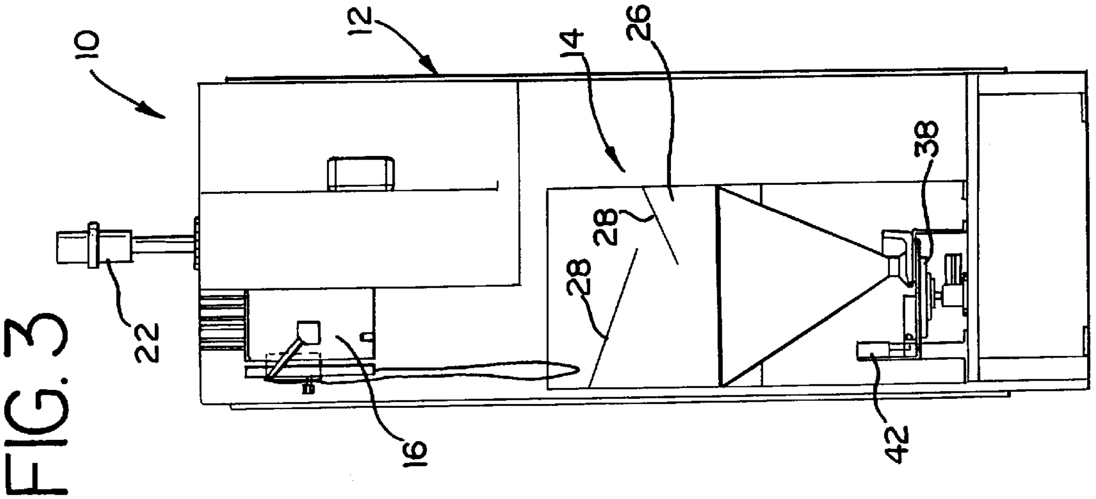
FIG. 3 is a side elevational diagrammatic view of the apparatus illustrated in FIG. 1.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figure 2:
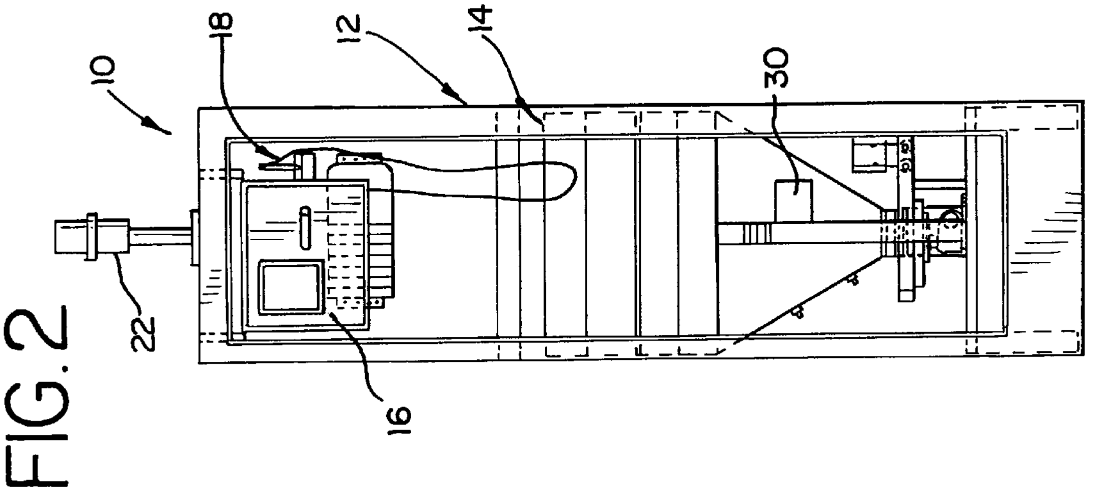
FIG. 2 is a front elevational, diagrammatic view of the apparatus illustrated in FIG. 1.
Figure 1:
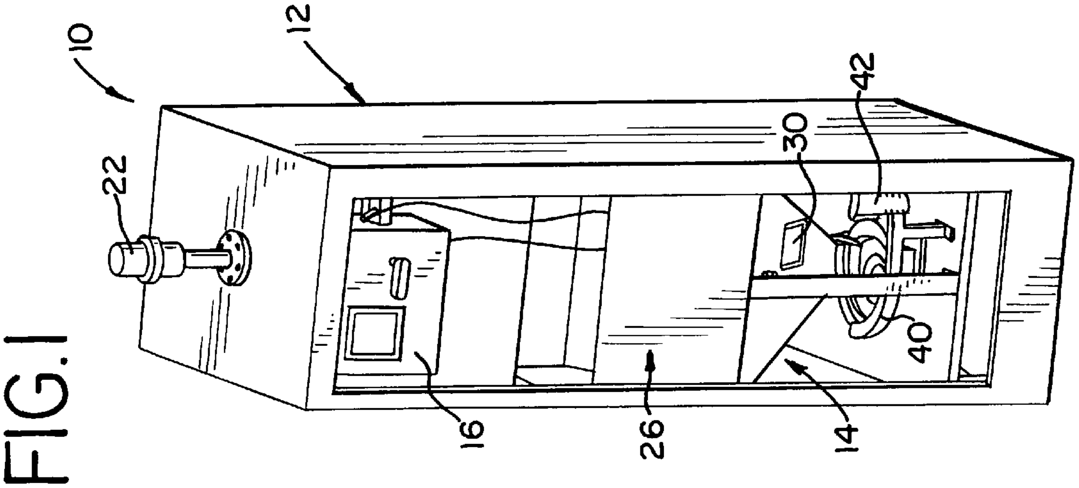
FIG. 1 is a perspective view of an article blending apparatus embodying the principles of the present invention.

With reference first to FIGS. 1–3, therein is illustrated a blending apparatus 10 embodying the principles of the present invention. As will be further described, blending apparatus 10 is intended to facilitate blending of first and second streams of discrete promotional articles to create a blended stream, wherein the first and second articles are provided in the blended stream at a ratio having a predetermined value. The illustrated embodiments of the invention have been configured for use in connection with promotional closure articles, such as for subsequent application to beverage containers and the like. It is contemplated that the promotional closures may all include indicia indicating the game or promotion associated therewith. Certain ones of the closures comprise winning articles, such as having a prize or cash value associated therewith, while other ones of the closures comprise non-winning articles. As will be recognized, the principles of the present invention are applicable to creation of blended product streams for promotions other than use in connection with plastic closures or the like, and further, may be used in applications apart from promotions where it is desired to achieve precise and cost-effective blending of discrete articles in predetermined ratios.

The blending apparatus illustrated in FIGS. 1–3 includes a housing 12 within which is positioned a dispensing apparatus 14, as will be further described. Programmable controls 16 facilitate automated operation of apparatus 10, with the apparatus preferably including a bar code reader 18, operatively connected to the controls 16. As will be further described, the provision of the bar code reader 18 permits input into the apparatus 10 of information regarding articles supplied to the apparatus, which articles themselves are contemplated as comprising a blended stream of winning promotional articles having differing values.

The apparatus 10 is illustrated as including an alarm signal light 22, which is preferably provided for providing signals indicating the level of articles within the dispensing apparatus 14.

Figure 4:
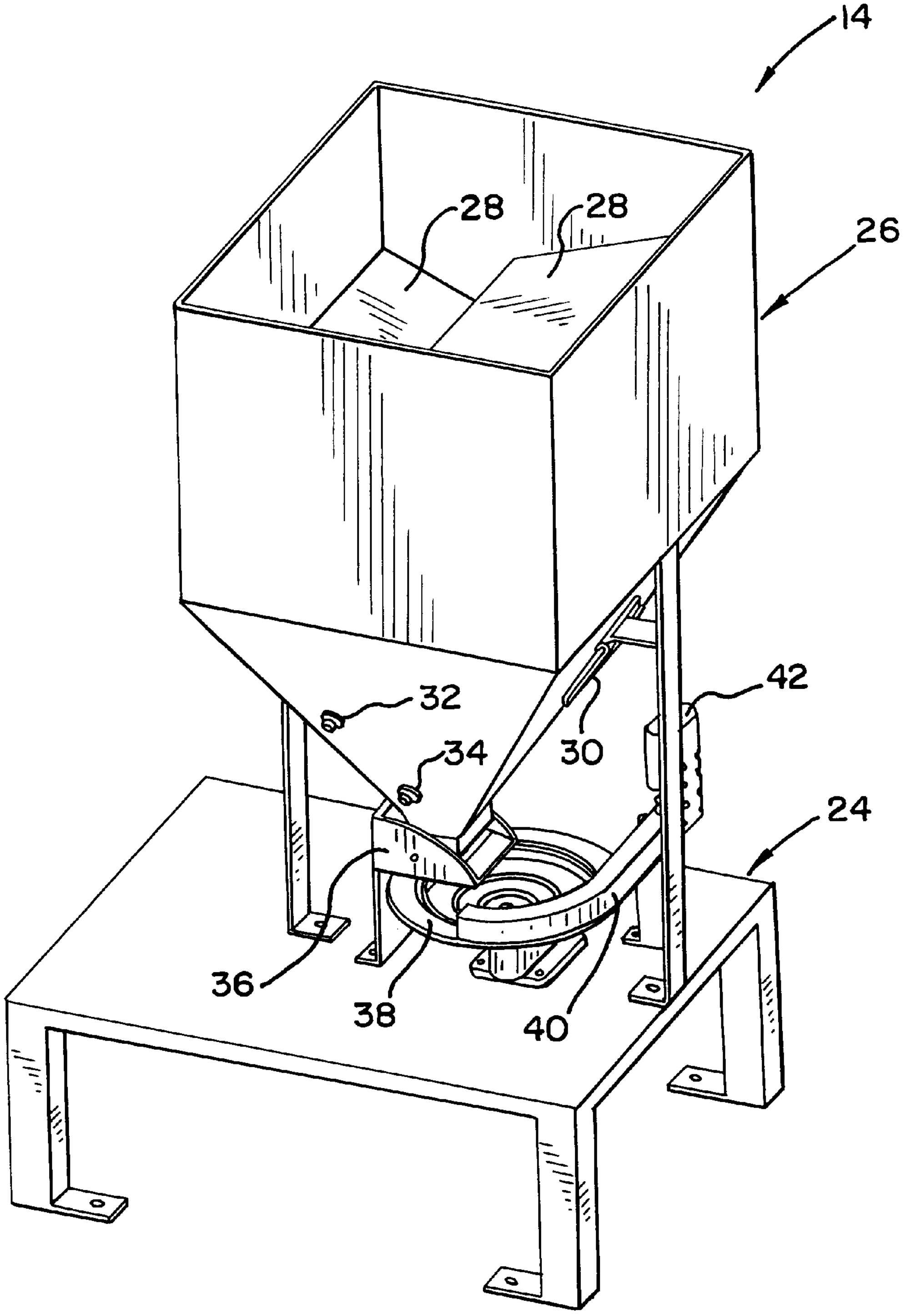
FIG. 4 is a perspective diagrammatic view of a dispensing apparatus of the blending apparatus illustrated in FIGS. 1–3.
Figure 6:
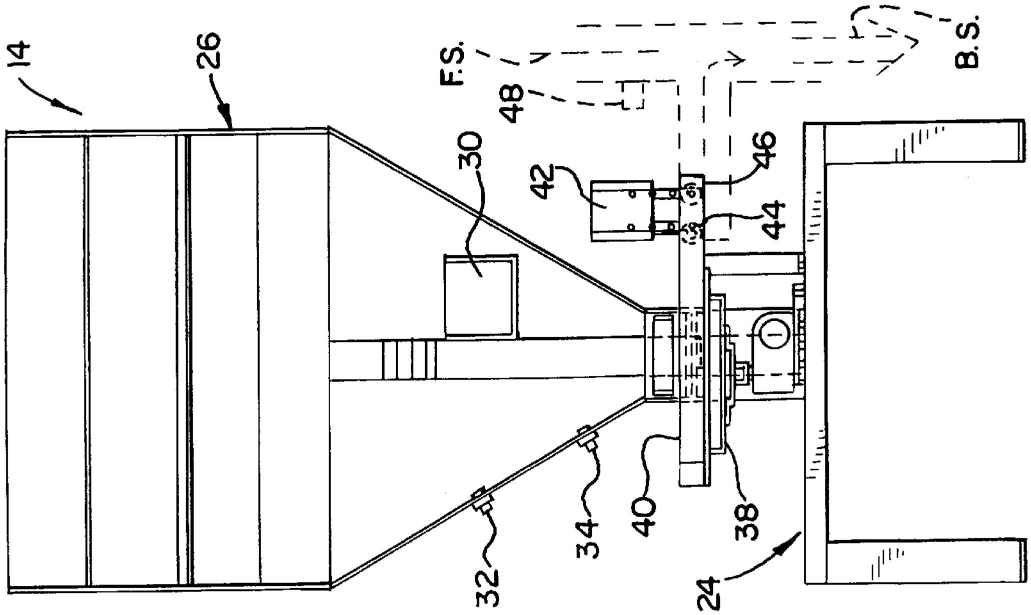
FIGS. 5 and 6 are diagrammatic views of the dispensing apparatus illustrated in FIG. 4.
Figure 5:
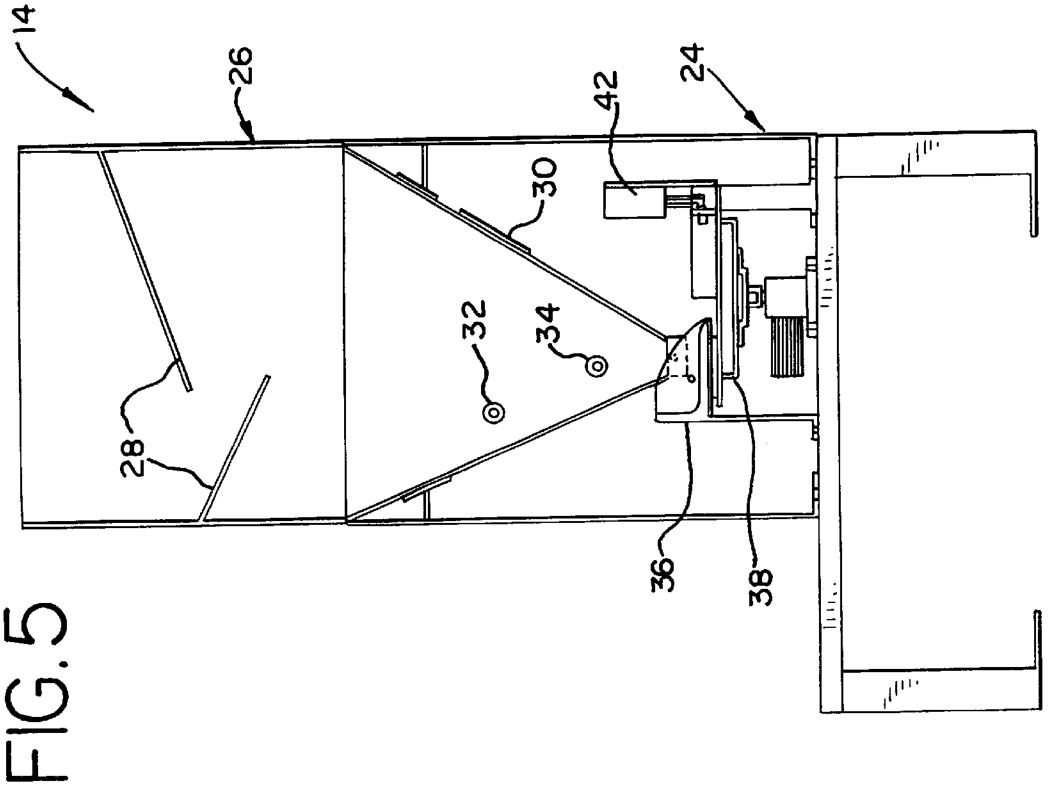

With particular reference to FIGS. 4, 5, and 6, therein is illustrated the dispensing apparatus 14 of blending apparatus 10. The dispensing apparatus is of desirably straightforward construction for reliable, cost-effective operation, and includes a frame 24 upon which is mounted a gravity-feed storage hopper 26. With consideration of the contemplated use of the apparatus for blending of promotional articles which typically have certain value, the storage hopper 26 is preferably provided with anti-pilferage plates 28 which deter removal of articles from within the upper extent of the hopper.

Efficient operation of the apparatus is facilitated by the provision of a viewing window 30 so that operators can readily inspect the level of articles within the storage hopper. Additionally, a low level sensor 32, and an empty sensor 34 are preferably provided with these sensors, in turn, preferably operatively connected with alarm signal light 22 for alerting operating personnel of the depletion of articles from within the hopper.

As will be recognized, blending of articles such as plastic closures and the like into precise ratios of predetermined values requires that the articles be counted as they are dispensed from the storage hopper 26. Experience has shown that weight fluctuations from one article to the next, which typically occur attendant to mass production of articles such as closures, does not permit "counting" of closures by weighing to be sufficiently precise. Thus, the present apparatus is preferably configured to present the articles in a single line for dispensing one-at-a-time.

For purposes of the present disclosure, the term "counting" is intended to encompass handling techniques whereby the number of discrete articles handled is exactly determined, through suitable sensors and the like. While the present invention contemplates counting articles one-at-a-time, it will be appreciated that the invention can be similarly practiced by otherwise counting the discrete articles, such as two-at-a-time, etc. As will also be appreciated, the contemplated counting of articles is to be differentiated from processes wherein numbers of articles being handled are ascertained volumetrically or by weight.

The dispensing apparatus 14 includes a cap metering tray 36 which receives articles from the storage hopper 26 by gravity feed. The cap metering tray 36 is vibratory-driven so that articles received from the storage hopper are transferred from the metering tray into an orientation bowl 38. The orientation bowl 38, also vibratory-driven, acts to orient the articles in a single line, with the articles generally directed upwardly from the orientation bowl into an accumulation conveyor 40. In the case of cup-shaped plastic closures, the orientation bowl acts to align the closures in a single line within the accumulation conveyor, although it is not critical whether or not the closures be upwardly or downwardly oriented.

Articles carried by the accumulation conveyor are directed from the orientation bowl to a dispensing actuator 42. The actuator 42 may comprise a suitable pneumatic actuator, solenoid actuator, or the like, with the actuator 42 configured to dispense articles from the accumulation conveyor one-at-a-time. To this end, the dispensing apparatus preferably includes a pair of sensors at the actuator 42, including a "article present" sensor to detect that an article is present for dispensing, and a verification sensor 46 to provide a signal verifying that an article has been dispensed attendant to operation of actuator 42. As will be appreciated, actuator 42 and sensors 44 and 46 are operatively connected with the controls 16 of the blending apparatus 10, with operation of actuator 42 effected in accordance with signals received from the controls to create the desired ratio of promotional articles in the blended stream being created.

As noted above, blending apparatus 10 can be operated to facilitate creation of a blended stream (designated "BS") of winning and non-winning promotional articles by the creation of a second stream of discrete winning promotional articles which are introduced, at a predetermined ratio, into a first stream ("FS") of discrete non-winning promotional articles. This is achieved, in accordance with the present invention, by conveying the articles in the first stream to the apparatus 10, and automatically counting a predetermined number of articles in the first stream, such as by the provision of a suitable sensor device 48 operatively associated with the first product stream. Thereafter, at least one article from the second product stream is introduced, by operation of actuator 42, into the first product stream to create the desired blended article stream. The blended article stream can be subsequently packaged for shipment and later use, or may be conveyed directly to an associated packaging device or the like. In the case of creating a blended stream of promotional closure articles, the blended stream may be directed from the blending apparatus 10 to an associated closure-applying apparatus, such as at a bottling facility.

Because the blending apparatus 10 is advantageously employed for blending winning promotional articles into a stream of non-winning articles, it is desirable to control and monitor the access of personnel to the apparatus 10. Suitable switches can be operatively connected with the doors of the housing, which can then provide signals to the controls 16 which reflect access to the interior of the apparatus. The housing for the apparatus can be suitably constructed to deter pilferage of articles from its interior, with operation of the apparatus, by controls 16, facilitating the creation of the desired blended product stream at precise, predetermined ratios.

Figure 7:
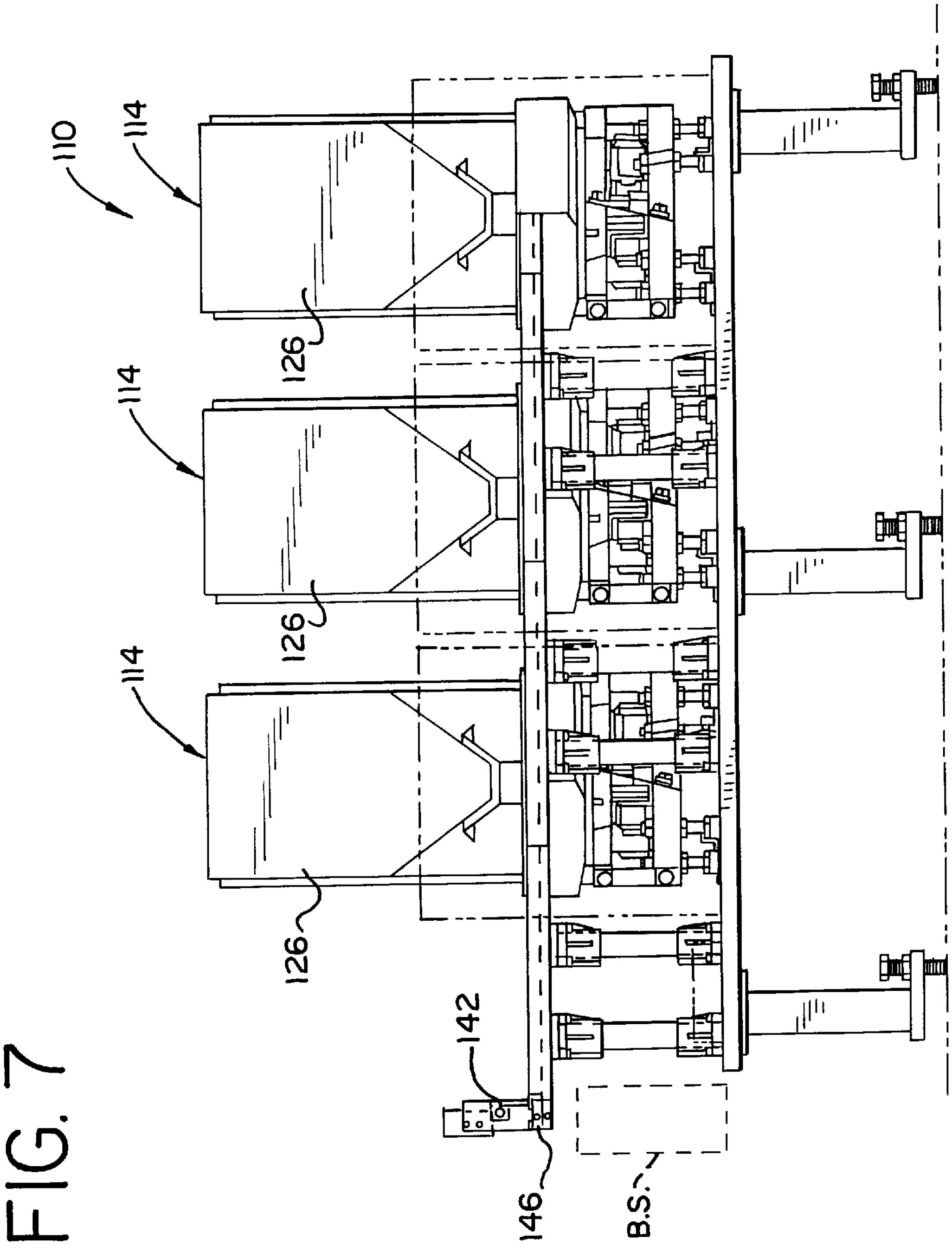
FIG. 7 is a diagrammatic view of an alternate embodiment of the present apparatus, including plural dispensing apparatus each generally configured in accordance with the dispensing apparatus of FIG. 4.
Figure 8:
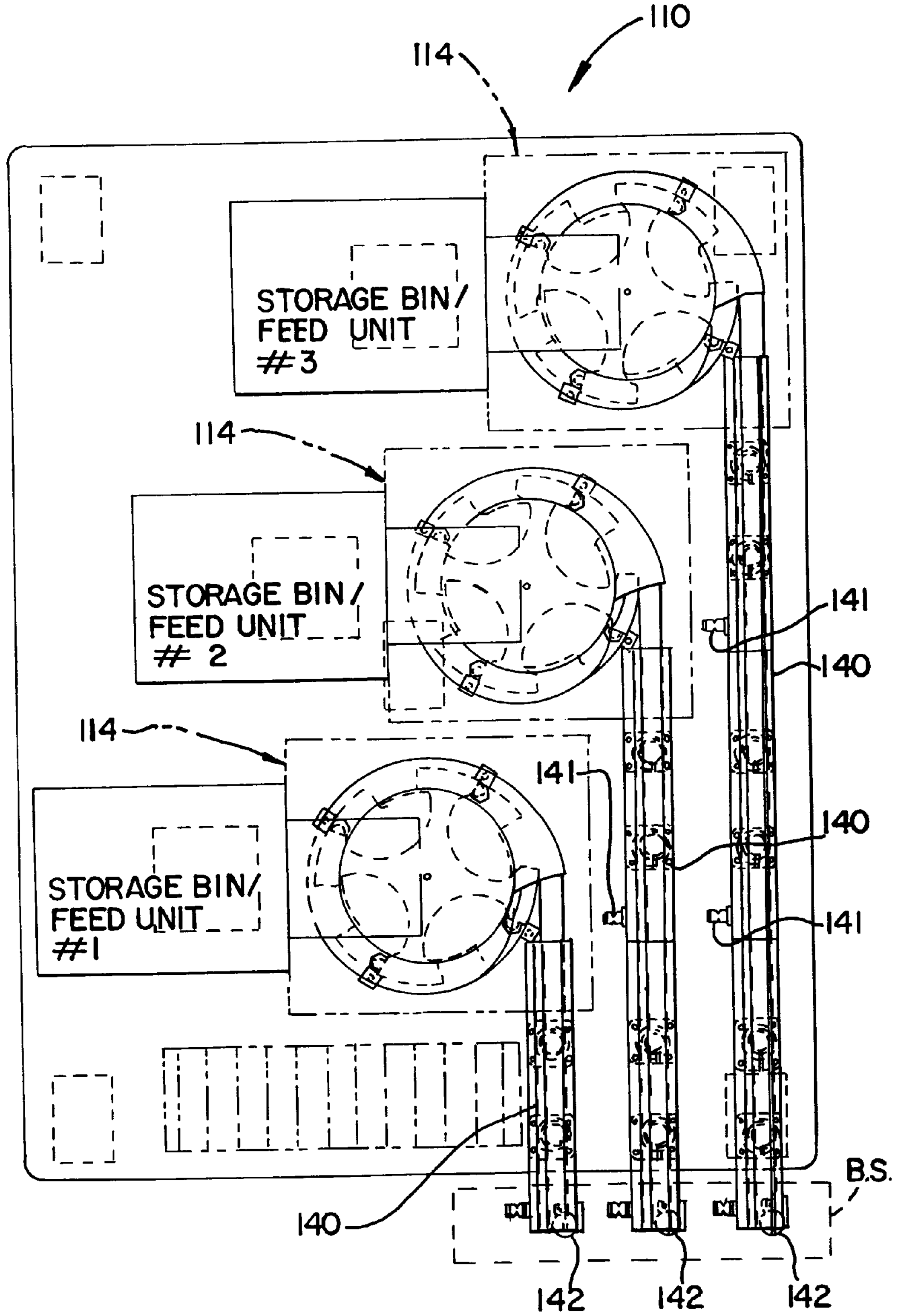
FIG. 8 is a top diagrammatic view of the blending apparatus illustrated in FIG. 7.

While apparatus 10 is intended to introduce winning articles into the overall product mix, an alternate embodiment of the present invention, illustrated in FIGS. 7 and 8, is intended to facilitate the creation of a blended stream of articles comprising a plurality of differing winning promotional articles, such as articles having differing values. This apparatus, designated blending apparatus 110, includes a plurality of dispensing apparatus 114, each of which is configured generally in accordance with the previously described dispensing apparatus 14. Accordingly, each dispensing apparatus 114 includes a gravity-feed storage hopper 126, with each of the dispensing apparatus intended to effect handling and dispensing of winning promotional articles each having a respective, different value. In this manner, an overall "winning" blended stream can be created with articles from each of the first, second, and third article streams being present in the blended stream in predetermined ratios to each other. By way of example, it may be desirable to blend articles such that a ratio between articles A and B is 20:1, while a ratio between articles A and C is 200:1. Operation of blending apparatus 110 facilitates the creation of a blended stream having such predetermined ratios. In turn, this resultant blended stream can be introduced into the overall product mix, by use of the apparatus 10 previously described, whereby the initially formed blended stream of winning promotional articles is thereafter blended, at the desired ratio, into the stream of non-winning promotional articles.

The apparatus 110 includes a plurality of accumulation conveyors 114 respectively associated with the dispensing apparatus 114, with the accumulation conveyors 140 including suitable conveying air jets 141. Each of the accumulation conveyors terminates at a respective dispensing actuator 142, which may be pneumatically operated. Each of the accumulation conveyors 140 preferably includes a verification sensor 146 (FIG. 7) associated therewith so that a signal is provided verifying dispensing of articles one-at-a-time from each of the conveyors 140. A blended stream "BS" is thus formed for subsequent conveyance or packaging.

Figure 9:
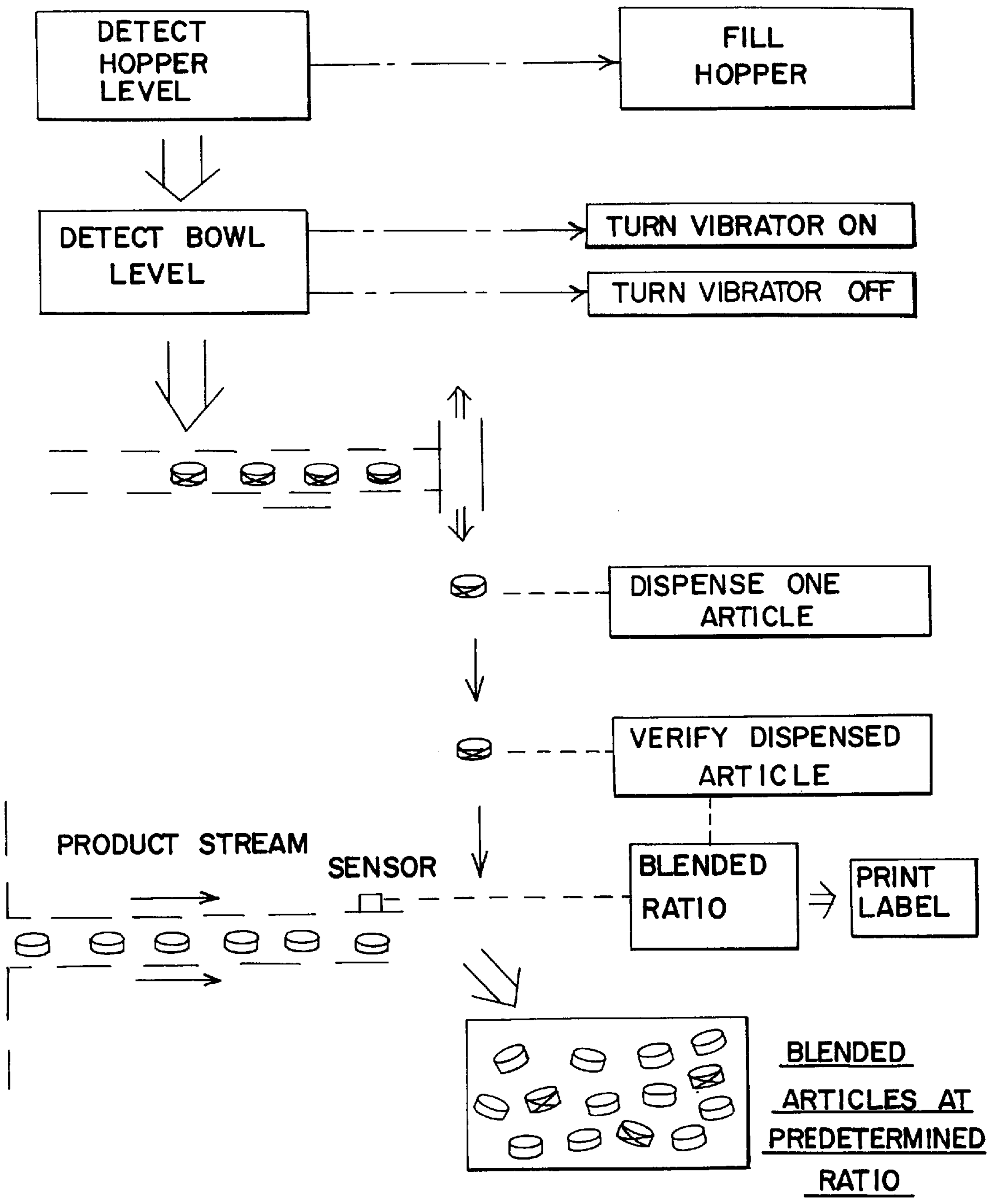
FIG. 9 is a diagrammatic illustration of operation of the present invention, and practice of the present method.

A particularly desirable feature of the present invention relates to the creation of a printed record corresponding to the blended stream of articles which is formed. This is illustrated diagrammatically in FIG. 9, which diagrammatically illustrates the operation of the present apparatus. Dispensing of articles is verified as described above, with a sensor provided for counting articles from the associated product stream to achieve the desired blended ratio. The creation of a printed record, such as a bar code label, magnetic encryption label, or the like, provides a record which reflects the exact blend of articles which has been created. This printed record can then be inputted to the bar code reader 18 of blending apparatus 10, whereby the automatic controls 16 of the apparatus can effect creation of a further blended article stream, with all of the articles therein provided at the desired predetermined ratios to each other. Automation in this manner, with creation of printed records for inputting as described, greatly facilitates efficient and cost-effective creation of blended product streams having the desired ratio of articles therein. As will be appreciated, these features of the present invention greatly facilitate its use in connection with product promotions and the like, wherein it is necessary to create blends of articles at ratios having predetermined values.

As will be recognized, the present invention can be practiced to create randomized blends of articles at the overall desired ratios. Randomization can be achieved through operation of the controls of the apparatus to achieve random introduction of articles from one stream into another, while still achieving the desired ratios. Depending upon the exact handling equipment employed, such as pneumatic conveyors and the like, further randomization can be effected. Interim bulk packaging of the blended promotional articles can also contribute to randomization.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

What is claimed is:

1. A method of creating a blended stream of promotional articles, comprising the steps of:

providing a first stream of discrete promotional articles;

providing a second stream of discrete promotional articles;

automatically counting a predetermined number of promotional articles in said first stream; and introducing at least one promotional article from said second stream into said first stream to create the blended stream of promotional articles, wherein the ratio of said articles from said first stream to said articles from said second stream comprises a predetermined value.

2. A method in accordance with claim 1, wherein said first product stream comprises non-winning promotional articles, and said second product stream comprises winning promotional articles.

3. A method in accordance with claim 1, wherein said first and second product streams respectively comprise different winning promotional articles.

4. A method in accordance with claim 1, wherein said step of providing said second product stream includes storing a plurality of discrete articles, dispensing the stored discrete articles one-at-a-time, and verifying that each of the articles is dispensed during said dispensing step.

5. A method in accordance with claim 1, including providing a third stream of promotional articles;

counting the promotional articles in said blended stream of articles, and introducing at least one promotional article from said third product stream into said blended stream to create a further blended stream comprising promotional articles from said first, second, and third streams in predetermined ratios to each other.

6. A method in accordance with claim 5, wherein the articles in each of said first, second, and third streams comprise winning promotional articles.

7. A method in accordance with claim 1, including providing a third stream of promotional articles;

counting the articles in said third stream; and introducing at least one promotional article from said blended stream into said third stream to create a further blended stream comprising promotional articles from said first, second and third streams in predetermined ratios to each other.

8. A method in accordance with claim 7, wherein said articles in said first and second streams forming said blended stream comprise winning promotional articles, and said articles in said third stream comprise non-winning promotional articles.

9. A method in accordance with claim 1, including creating a printed record corresponding to said blended stream of promotional articles.

10. A method in accordance with claim 9, including providing a third stream of promotional articles;

counting the articles in said third stream; and inputting said printed record into means for controlling introduction of at least one promotional article from said blended stream into said third stream to create a further blended stream comprising promotional articles from said first, second and third streams in predetermined ratios to each other.

* * * * *

UNITED STATES PATENT AND TRADEMARK OFFICE

CERTIFICATE OF CORRECTION

PATENT NO. : 5,979,702

DATED : November 9, 1999

INVENTOR(S) : Thomas P. Hennessy et al

It is certified that error appears in the above-identified patent and that said Letters Patent is hereby corrected as shown below:

On the title page, item [75]:

Inventor "Hennessey" should be spelled "Hennessy"

Signed and Sealed this

Eleventh Day of July, 2000

Attest:

Q. TODD DICKINSON

*Attesting Officer*

*Director of Patents and Trademarks*